United States Patent
Oswal et al.

(10) Patent No.: US 10,552,595 B2
(45) Date of Patent: Feb. 4, 2020

(54) METHODS AND APPARATUS FOR AUTHENTICATION IN AN ELECTRONIC DEVICE

(71) Applicant: Cirrus Logic International Semiconductor Ltd., Edinburgh (GB)

(72) Inventors: Nikesh Oswal, Newbury (GB); Ryan Roberts, Hertfordshire (GB); Michael Page, Gloucestershire (GB)

(73) Assignee: Cirrus Logic, Inc., Austin, TX (US)

(*) Notice: Subject to any disclaimer, the term of this patent is extended or adjusted under 35 U.S.C. 154(b) by 71 days.

(21) Appl. No.: 15/804,714

(22) Filed: Nov. 6, 2017

(65) Prior Publication Data

US 2018/0129796 A1 May 10, 2018

Related U.S. Application Data

(60) Provisional application No. 62/497,070, filed on Nov. 7, 2016.

(30) Foreign Application Priority Data

Dec. 20, 2016 (GB) .................................. 1621717.6

(51) Int. Cl.
*G06F 21/32* (2013.01)
*G06F 21/57* (2013.01)
(Continued)

(52) U.S. Cl.
CPC .............. *G06F 21/32* (2013.01); *G06F 21/57* (2013.01); *G06F 21/604* (2013.01);
(Continued)

(58) Field of Classification Search
None
See application file for complete search history.

(56) References Cited

U.S. PATENT DOCUMENTS 10,075,437 B1 9/2018 Costigan
2002/0174348 A1* 11/2002 Ting .................... G06F 21/32
713/186

(Continued)

FOREIGN PATENT DOCUMENTS

EP 1521161 A2 4/2005
EP 3026667 A1 6/2016
(Continued)

OTHER PUBLICATIONS

International Search Report and Written Opinion of the International Searching Authority, International Application No. PCT/GB2017/053328, dated Jan. 25, 2018.
(Continued)

*Primary Examiner* — Ponnoreay Pich
(74) *Attorney, Agent, or Firm* — Jackson Walker L.L.P.

(57) ABSTRACT

Embodiments of the invention provide methods and apparatus for monitoring the routing configuration within an electronic device such that a biometric authentication process can be carried out without interference from other components of the device, such as may occur when the device has become infected with malware for example. The invention may provide a codec or speaker recognition processor, coupled to receive biometric input data, comprising a security module that determines whether a routing configuration complies with one or more rules. The security module may be implemented to prevent genuine biometric data from being output from the speaker recognition processor, and/or to prevent spoof biometric data from being inserted into the authentication module.

25 Claims, 7 Drawing Sheets

(51) Int. Cl.
*G06K 9/00* (2006.01)
*G06F 21/60* (2013.01)
*G10L 17/00* (2013.01)
*G10L 17/24* (2013.01)

(52) U.S. Cl.
CPC ..... *G06K 9/00885* (2013.01); *G06K 9/00899* (2013.01); *G10L 17/005* (2013.01); *G06K 2009/00953* (2013.01); *G10L 17/24* (2013.01)

(56) References Cited

U.S. PATENT DOCUMENTS

| | | | |
|---|---|---|---|
| 2003/0163739 | A1 | 8/2003 | Armington et al. |
| 2006/0020792 | A1* | 1/2006 | Weiss ............... G06F 21/57 713/168 |
| 2007/0281761 | A1 | 12/2007 | Kim |
| 2009/0005891 | A1 | 1/2009 | Batson et al. |
| 2009/0238418 | A1 | 9/2009 | Sato |
| 2013/0226586 | A1 | 8/2013 | Jang et al. |
| 2013/0246800 | A1 | 9/2013 | Stewart |
| 2015/0035643 | A1 | 2/2015 | Kursun |
| 2015/0088509 | A1 | 3/2015 | Gimenez et al. |
| 2015/0332057 | A1 | 11/2015 | Chang et al. |
| 2016/0005038 | A1 | 1/2016 | Kamal |
| 2016/0087976 | A1 | 3/2016 | Kaplan et al. |
| 2016/0094338 | A1 | 3/2016 | Pappachan et al. |
| 2016/0324478 | A1 | 11/2016 | Goldstein |
| 2017/0180386 | A1 | 6/2017 | Dewan et al. |
| 2018/0039768 | A1 | 2/2018 | Roberts |
| 2018/0039769 | A1 | 2/2018 | Saunders |

FOREIGN PATENT DOCUMENTS

| | | | |
|---|---|---|---|
| GB | 2388947 | A | 11/2003 |
| WO | 99/00720 | A2 | 1/1999 |
| WO | 02/32308 | A1 | 4/2002 |
| WO | 2008111340 | A1 | 9/2008 |
| WO | 2010066269 | A1 | 6/2010 |
| WO | 2016200523 | A1 | 12/2016 |

OTHER PUBLICATIONS

Search Report under Section 17, UKIPO, Application No. GB1621717.6, dated Jun. 14, 2017.
Andreou, "Chapter 1, Switch-based logic functions," Retrieved from the Internet: <URL: https://web.archive.org/web/20150629212237/https://www.ece.jhu.edu~/andreou/216/Archives/2014/Handouts/POP_Ch1-2.pdf> (Year: 2015).
Rouse, Margaret, "FIDO (Fast Identity Online)", Retrieved from the Internet: <URL: https://web_archive_org//web/20150418061110/https://searchsecurity.techtarget.comidefinition/FIDO-Fast-Identity-Online> (Year: 2015).
International Search Report and Written Opinion of the International Searching Authority, International Application No. PCT/GB2017/052249, dated Dec. 6, 2017.
Combined Search and Examination Report under Sections 17 and 18(3), Application No. GB1616899.9, dated Apr. 5, 2017.
Search Report under Section 17(6), Application No. GB1616899.9, Claims 47-52, dated Jul. 26, 2017.
Search Report under Section 17(6), Application No. GB1616899.9, Claims 18-31, dated Jul. 26, 2017.
Combined Search and Examination Report under Sections 17 and 18(3), Application No. GB1616897.3, dated Apr. 5, 2017.
Search and Examination Report under Sections 17 and 18(3), Application No. GB1616897.3, dated Jul. 26, 2017.
International Search Report and Written Opinion of the International Searching Authority, International Application No. PCT/GB2017/052251, dated Nov. 23, 2017.
Combined Search and Examination Report under Sections 17 and 18(3), Application No. GB1715273.7, dated Feb. 21, 2018.

* cited by examiner

METHODS AND APPARATUS FOR AUTHENTICATION IN AN ELECTRONIC DEVICE

TECHNICAL FIELD

Examples of the present disclosure relate to methods and apparatus for authentication in an electronic device, and particularly relate to methods and apparatus for authenticating the voice of a user of an electronic device.

BACKGROUND

The growing demand for more secure, more reliable and more convenient user authentication solutions for mobile devices is accepted and publicized in the industry.

It is expected that biometrics will replace passwords, particularly on mobile platforms, as long passwords are difficult to remember and difficult to type on such devices. For example, in order to improve user experience, many manufacturers of mobile phones have embedded fingerprint sensors in their recent devices, and it is expected that users will increasingly adopt biometrics in order to access their device and/or specific functions thereon. Other types of biometric authentication include iris recognition and voice recognition. Multiple different types of authentication (e.g. passwords, fingerprint/iris/voice recognition, etc) may be combined in order to increase the security of a particular operation.

While the use of biometrics in general increases the security of a particular operation, by ensuring the person requesting that the operation be carried out is a registered user of that device, biometric solutions are not invulnerable to attacks from third parties. For example, a fingerprint of a particular user may be stolen (e.g. "lifted" from an object the user has touched) by a third party intent on using that fingerprint to access the user's device. The user's voice may be recorded by a third party and played back to the device in order to bypass voice biometric security. A picture of the user's iris may be acquired and used to bypass iris recognition software.

All of these techniques require significant effort on the part of the third party attempting to gain access to the user's device. Further, even if successful, the techniques allow that third party access to just a single device at a time. A more threatening technique for bypassing biometric security systems, requiring fewer resources and scalable to multiple devices at a time, may involve the surreptitious installation of malware on the user's device. For example, such malware may be able to bypass or otherwise prevent security processes from functioning effectively, and thus allow the third-party attacker access to the devices on which it is installed.

A mechanism is therefore required to defend biometric authentication systems against such software-based attacks.

SUMMARY

One particular form of malware identified as a threat by the present inventors may be able to reconfigure signal paths so as to allow direct injection of recorded or spoof biometric data or interference signals into the input of a biometric authentication module and thus allow the third-party attacker access to the devices on which it is installed.

According to one aspect of the disclosure, there is provided a biometric authentication system, comprising: one or more inputs, for receiving biometric input signals from a user; a biometric authentication module having one or more biometric authentication module inputs, and being configured to carry out biometric authentication of signals received at the one or more biometric authentication module inputs and generate an authentication result; a control interface, for receiving one or more control signals from an application processor; a routing module, having a set of routing inputs and a set of routing outputs, at least one of the routing inputs being coupled to the one or more inputs and at least one of the routing outputs being coupled to the biometric authentication module, the routing module being configurable by the one or more control signals to route signals from one or more of the routing inputs to one or more of the routing outputs; and a security module, operable to determine whether a routing module configuration complies with one or more rules and, responsive to a determination that the routing module configuration does not comply with one or more of the one or more rules, generate a signal indicating that the routing module configuration is insecure.

In another aspect, there is provided a biometric authentication system, comprising: one or more inputs, for receiving biometric input signals from a user; a biometric authentication module having one or more biometric authentication module inputs, and being configured to carry out biometric authentication of signals received at the one or more biometric authentication module inputs and generate an authentication result; a plurality of configurable signal paths terminating at the one or more biometric authentication module inputs, at least one of the configurable signal paths originating at the one or more inputs; and a security module, operable to determine whether the plurality of signal paths complies with one or more rules and, responsive to a determination that the plurality of signal paths does not comply with one or more of the one or more rules, generate a signal indicating that the signal path configuration is insecure.

A further aspect provides a biometric authentication system comprising: a routing module, configurable in use to route received signals to at least one routing module output from a selected one or more of a plurality of routing module inputs; a biometric authentication module coupled to receive signals from said at least one routing module output, and being configured to generate a biometric authentication result based on at least the signals received from said at least one routing module output; and a security module, operable to determine whether the routing module is configured compliant with one or more rules and, if not compliant, modify the biometric authentication result.

The disclosure also provides an electronic device comprises any of the biometric authentication systems described above. For example, the electronic device may be: a portable device; a battery-powered device; a mobile telephone; an audio player; a video player; a personal digital assistant; a wearable device; a mobile computing platform; a laptop computer; a tablet computer; a games device; a remote control device; a toy; a domestic appliance or controller thereof; a domestic temperature or lighting control system; a security system; or a robot.

In another aspect, there is provided a method in a biometric authentication system, comprising: receiving biometric input signals from a user; routing the biometric input signals, via a routing module, to a biometric authentication module having one or more biometric authentication module inputs, the routing module being configured in dependence on one or more control signals received from an application processor; and determining whether the routing module configuration complies with one or more rules and, responsive to a determination that the routing module configuration does not comply with one or more of the one or more rules, generating a signal indicating that the routing module configuration is insecure.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
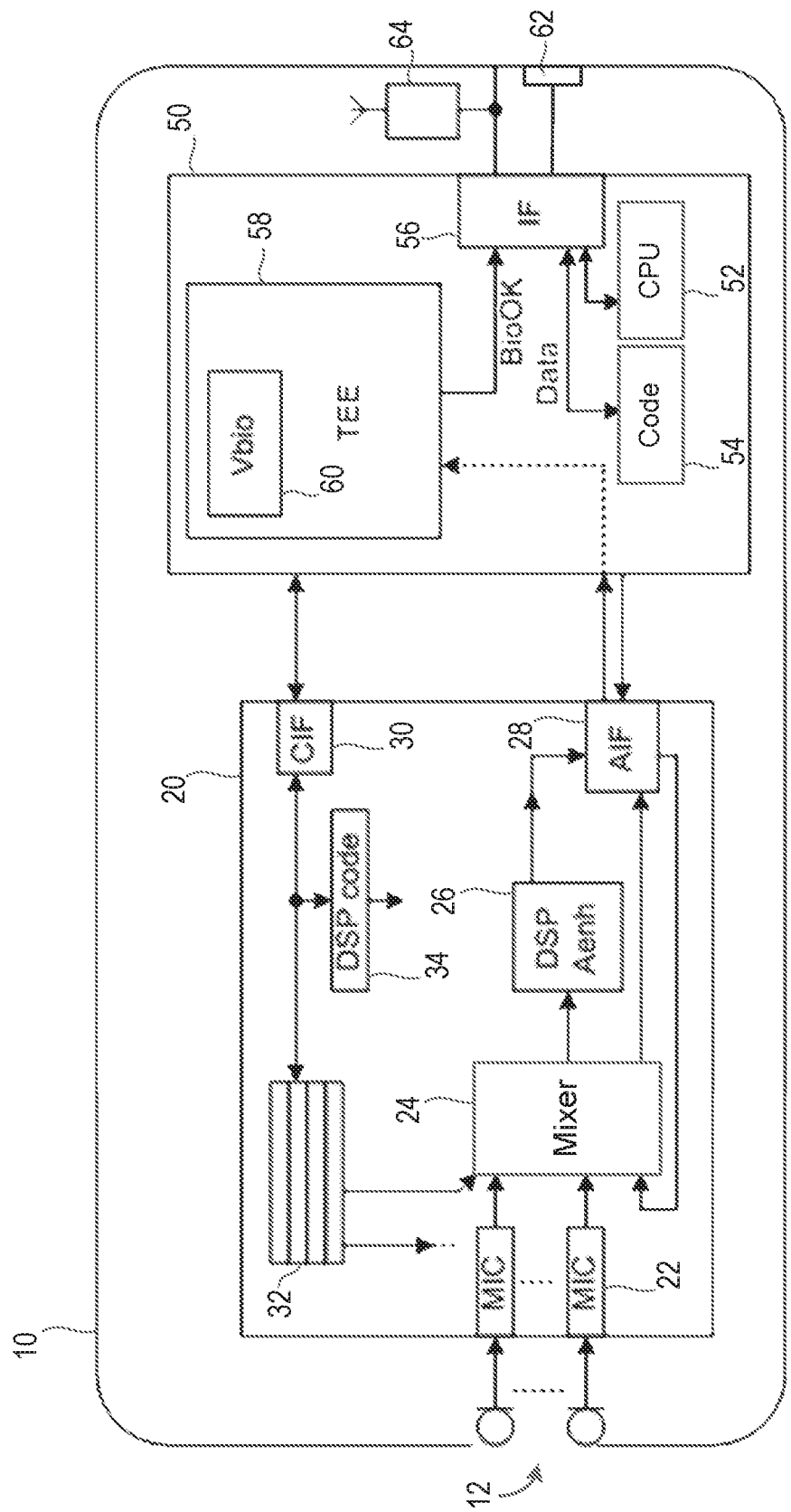
FIG. 1 shows an example of an electronic device.

FIG. 1 shows an example of an electronic device 10, which may for example be a mobile telephone or a mobile computing device such as a laptop or tablet computer. The device comprises one or more microphones 12 for receiving voice input from the user, a codec circuit 20 connected to the microphones 12, and an application processor (AP) 50 connected to the codec 20.

The microphones 12 are shown positioned at one end of the device 10. However, the microphones may be located at any convenient position on the device, and may capture more sources of sound than simply the user's voice. For example, one microphone may be provided primarily to capture the user's voice, while one or more other microphones may be provided to capture surrounding noise and thus enable the use of active noise cancellation techniques. To enable speakerphone mode in mobile telephones, or in other devices, for example lap-top computers, multiple microphones may be arranged around the device 10 and configured so as to capture the user's voice, as well as surrounding noise.

The codec 20 comprises one or more inputs 22 for receiving audio data from the microphones 12. Circuitry associated with an input 22 may comprise analog-to-digital convertor circuitry for receiving signals from analog microphones. In the illustration, a single input 22 is provided for the data from each microphone 12. In other arrangements, however, a single input 22 may be provided for more than one, or even all, of the microphones 12.

The codec 20 further comprises a routing module 24 in communication with one or more registers 32. Routing module 24 may be configurable to accept audio data from selected one or more inputs 22 and route this data to respective routing module outputs. Routing module 24 may be configurable to provide on any requested one or more routing module outputs a mix of input audio data from respective selected any two or more of the inputs 22, and thus may additionally comprise a mixing module or mixer. Routing module 24 may be configurable to apply respective defined gains to input or output audio data.

The registers 32 may store values specifying at which outputs the routing module 24 is to output audio data, which input or combination of inputs 22 each output audio data is to be based on and with what respective gain before or after mixing. Each of the registers 32 may be explicitly read from and written to by the AP 50 via a digital control interface 30 on the codec 20 (and a corresponding interface, not illustrated, on the AP 50). The register addresses and values may be controlled by driver software executed in the AP 50.

For example, audio data of the user's voice may be required for the device 10 to operate normally as a telephone. In that case, the mix-routing module 24 may be controlled so as to output audio voice data directly to an audio interface 28 (from where it can be output to the AP 50, for example). Other modes of operation may also require that the audio data be output directly to the audio interface 28. For example, when the device 10 additionally comprises one or more cameras, it may be used to record video. In that mode of operation, again audio data may be routed directly to the audio interface 28 to be output to the AP 50.

The AP 50 may itself provide audio data to the routing module 24 via the audio interface 28. For example, the device 10 may comprise one or more speakers (not illustrated) to output audio to the user (under control of the AP 50). That audio output may be detected by the microphones 12 and cause unwanted echoes in the audio signals acquired by the microphones. In order to negate these effects, the audio data to be output via the speakers may be provided by the AP 50 as an input to the routing module 24 via the audio interface 28. The output audio can then be cancelled, if required, from the audio data acquired by the microphones 12. If necessary, such echo cancellation may require processing by a digital signal processor (such as the digital signal processor 26, see below). In another example, an attenuated version of a voice microphone signal may be added to the signal to be reproduced by a speaker to provide a side-tone component to the user.

In another mode of operation, the routing module 24 may output audio data to a digital signal processor (DSP) 26 configured to enhance the audio data in one or more ways. For example, the device 10 may employ a voice biometric algorithm to provide security for one or more operations of the device 10, i.e. by authenticating the identity of the user of the device when carrying out certain sensitive operations. Voice biometric analysis may require or benefit from preprocessing of the audio data in order to achieve adequate accuracy. For example, the DSP 26 may employ one or more noise reduction techniques to mitigate or cancel background noise and so increase the signal-to-noise ratio of the audio data. The DSP may use beamforming techniques to improve the quality of the audio data. In general, these techniques require data from multiple microphones 12 and thus the routing module 24 may output audio data from multiple microphones to the DSP 26. In a further example, the DSP 26 may analyse and select for biometric authentication the best audio data signal for use in the biometric authentication process (e.g., the audio data signal having the highest signal to noise ratio). Those skilled in the art will appreciate that many algorithms may be carried out by the DSP 26 in order to enhance and amplify those portions of the audio data corresponding to the user's voice. The present disclosure is not limited to any particular algorithm or set of algorithms.

After processing the audio data, the DSP 26 may then output the processed data to the audio interface 28, either directly as illustrated or via the routing module 24.

As mentioned above, the codec 20 comprises a control interface 30 for receiving control signals from the AP 50. Control interface 30 may also be used to load DSP code 34 (for example to be executed in the DSP 26) from the AP into the codec 20, for example on start-up. The control interface 30 may implement any suitable communication specification, such as serial peripheral interface (SPI).

The AP 50 comprises a central processing unit (CPU) 52 and memory 54 providing registers and a cache. The CPU 52 and memory 54 are in communication with an interface 56 that couples the AP 50 to other components of the device. For example, the device 10 may comprise one or more components that allow the device to be coupled in a wired or wireless fashion to external networks, such as a wired interface 62 (e.g. a USB interface) or a wireless transmitter module 64 to provide wireless connection to one or more networks (e.g. a cellular network, a local Bluetooth® or a wide area telecommunication network). The device 10 may also comprise one or more storage components providing memory on a larger scale. These components are largely conventional and are therefore not described in any detail.

The AP 50 further comprises a trusted execution environment (TEE) 58 or other similar secure processing zone. The TEE 58 provides an isolated execution environment in which more sensitive processes can be carried out at a higher level of security than processes handled in the main CPU 52. For example, the TEE 58 may process only instructions that have been provided via a secure channel, for instance via data authentication, whereas the CPU may process instructions requiring less security, and avoid needless overhead of unwarranted security precautions.

For example, the TEE 58 may comprise a voice biometric authentication module 60, for providing biometric authentication of a user's voice. The biometric module 60 may receive audio data from the codec 20 via the audio interface 28, optionally after pre-processing by the DSP 26, and carry out biometric authentication in order to generate an authentication result. The biometric module 60 may have access to one or more databases allowing the user's voice to be identified from the audio data. The databases may comprise a universal background model (UBM), a cohort model, and/or a biometric voice print (BVP) for one or more authorised users.

One or more operations of the device 10 may require biometric authentication of the user before they can be carried out. For example, biometric authentication of the user may be required for one or more of: carrying out a financial transaction using the device 10 (e.g. via a banking or wallet app installed on the device); accessing encrypted communications such as encrypted e-mails; changing security settings of the device; allowing access to the device via a lock screen; turning the device on, or otherwise changing a power mode of the device (such as waking from sleep mode). The set of operations requiring biometric authentication may be configurable by the user, so as to apply a level of security that the user is comfortable with.

When required, therefore, the device 10 may enter a voice authentication mode in which audio data is acquired via the microphones 12, routed and processed by the routing module and the DSP 26, and output to the voice biometric authentication module 60 via the audio interface 28. The biometric module 60 carries out biometric authentication of the audio data, generates an authentication result ("BioOK"), and outputs the result for use by the device 10. The authentication result may be output from the device 10 to an external network or server. If the authentication result is positive (i.e. providing an indication that the audio input is that of an authorised user of the device), the device 10 (or the external server) may permit the restricted operation to be carried out. If the authentication result is negative (i.e. providing an indication that the audio input is not that of an authorised user of the device), the device 10 (or the external server) may not permit the restricted operation to be carried out.

One problem that has been identified with the device 10 shown in FIG. 1 arises when speaker authentication is required to turn the device on, or otherwise change a power mode of the device (such as waking from sleep mode). The codec 20 may have a low-power "always-on" or "Listen" mode in which it monitors for the presence of an input voice signal which may be a possible voice trigger. However, the processor 50 is a complex sub-system and will be at least mainly powered down.

When the codec detects a possible voice trigger it will respond with a signal to the processor 50 for it to inspect the signal sample and verify the user (e.g. using biometric module 60). However, the processor 50 is a complex sub-system and may take several seconds to boot up into a state where it can perform the voice authentication. This delay is unacceptable for many potential users.

A further problem that has been identified with the device 10 shown in FIG. 1 is the potential for malware (that is, malicious software installed on the device) to hijack audio data acquired by the microphones and bypass or "spoof" the biometric module 60. For example, the malware may run in an insecure area of the AP 50 (i.e. outside the TEE 58) and load false audio data into the input signal path of the codec 20. The false audio data may relate to some downloaded or otherwise synthesized speech sample intended to trick the biometric module 60 into generating a positive biometric result and permitting a restricted operation. The malware may hijack a signal path in the codec to acquire voice data relating to a genuine user of the device (for example during a genuine voice biometric authentication process) and store it in an insecure part of the AP 50. This sample may later be injected into the signal path for example via the AIF 28 to trick the biometric module into authorising an otherwise restricted operation.

Figure 2:
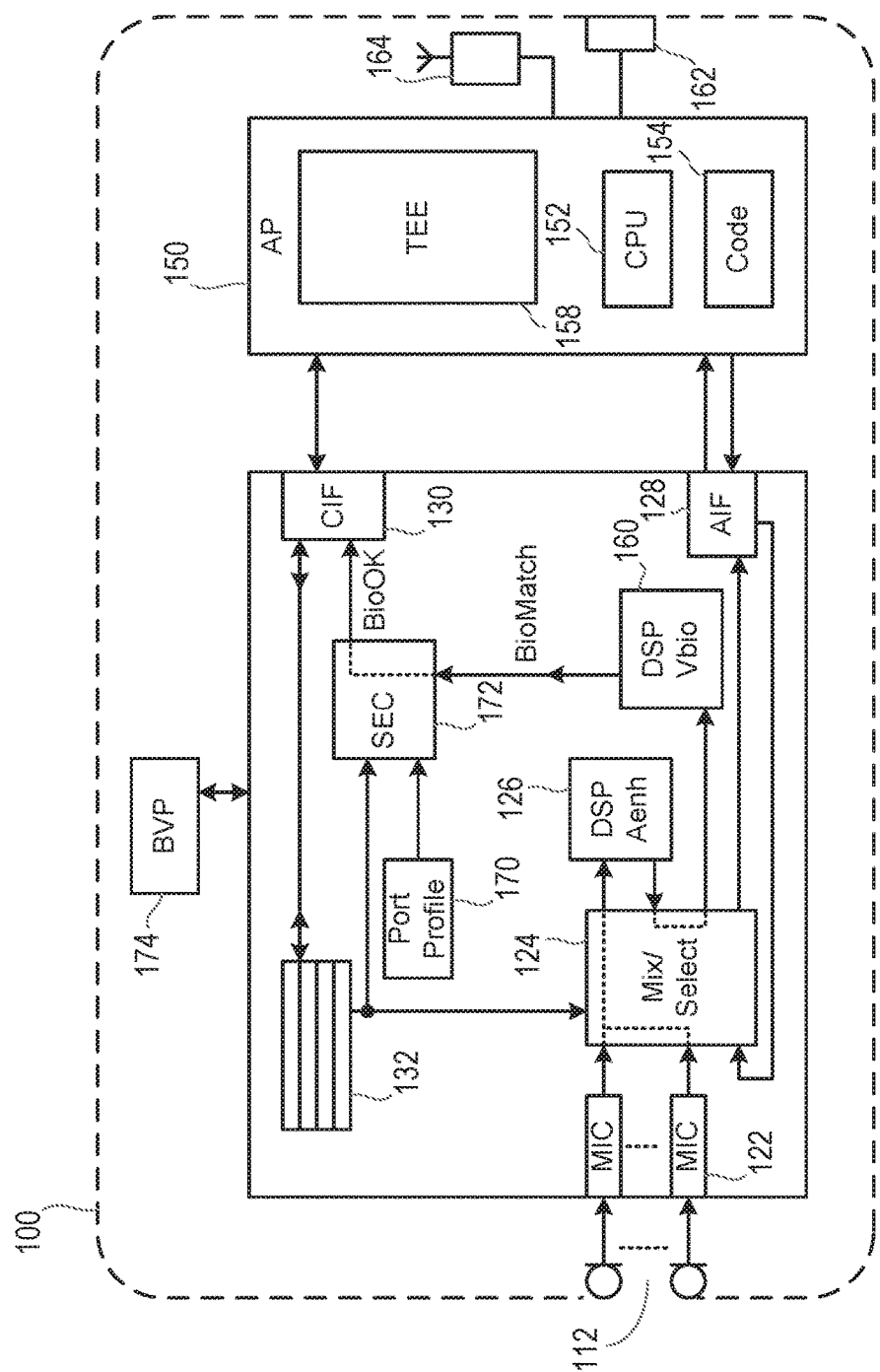
FIG. 2 shows an electronic device according to embodiments of the disclosure.

FIG. 2 shows a device 100 according to embodiments of the disclosure, intended to overcome one or more of these problems.

The device 100 again comprises one or more microphones 112, a speaker recognition processor (SRP) 120, and an application processor (AP) 150.

The SRP 120 differs from the codec 20 shown in FIG. 1 in a number of respects. For example, the SRP 120 comprises a security module 172 configured to monitor the signal routing configuration and generate a control signal if the configuration is judged insecure, as described in detail below. For example, the biometric authentication may be invalidated or aborted responsive to generation of the signal.

Further, in the embodiment illustrated in FIG. 2, the biometric authentication module 160 is removed from the AP 150 and placed in the SRP 120 itself. Thus, according to some embodiments, biometric data acquired during an authentication process is never passed outside the SRP 120 to the AP 150, thus preventing unauthorised copying of the data for example by malware on the AP for later use in spoofing the authentication process.

These and other aspects will be described in greater detail below.

In its overall architecture, the device 100 is substantially similar to the device 10 described with respect to FIG. 1 and may comprise one or more microphones 112, and an AP 150.

Device 100 comprises a Speaker Recognition Processor (SRP) 120. In some embodiments, the microphones 112 and the SRP 120 are arranged such that all signal paths from the microphones 112 pass through the SRP 120; that is, other components in the device 100 (e.g. the AP 150) can access the microphones 112 only through the SRP 120. The SRP 120 may be provided on a single chip (i.e. integrated circuit), separate from the AP 150, and communicate with the AP 150 over one or more internal buses of the device 100.

The AP 150 comprises a CPU 152 and cache/registers 154. The AP 150 is additionally coupled to a wired data interface 162 (e.g. a USB interface) and a wireless modem 164 of the device 100. The AP 150 can communicate with the SRP 120 via an audio interface 128 and a control interface 130. For example, control signals may be generated by the CPU 152 and sent to the SRP 120 via the control interface 130. Audio signals, such as those generated for output at one or more speakers of the device 100 (not illustrated) may be passed to the SRP 120 via the audio interface 128. AP 150 may comprise a Trusted Execution zone 158 for use for other purposes, but as noted above, in this embodiment the biometric authentication module 160 is advantageously located in the SRP 120, rather than requiring any TEE 158.

The SRP 120 comprises one or more inputs 122 for receiving audio data from the microphones 112. In some embodiments, circuitry in SRP 120 associated with one or more of inputs 122 may comprise analog-to-digital convertor (ADC) circuitry for receiving signals from analog microphones. In some embodiments, one or more of inputs 122 may comprise a digital interface for accepting signals from digital microphones. Such digital interfaces may comprise standard 1-bit pulse-density-modulated (PDM) data streams, or may comprise other digital interface formats. Some or all of microphones 112 may be coupled to inputs 122 directly, or via other circuitry, for example ADCs or a codec, but in all cases such inputs are still defined as microphone inputs in contrast to inputs used for other purposes. In the illustration, a corresponding input 122 is provided for the data from each microphone 112. In other arrangements, however, an input 122 may receive data from more than one, or even from all, of the microphones 112, for instance as a time-multiplexed digital signal and/or using a standard data transmission format or protocol such as Soundwire™.

The SRP 120 further comprises a routing module 124 in communication with one or more routing registers 132, which receives the audio data from the inputs 122. The inputs 122 may be connected only to the routing module 124 such that no other components are able to directly access the signals on inputs 122.

The routing module 124 routes or mixes or applies gains to audio data received from the inputs 122, in dependence on values stored in routing registers 132, to one or more routing module outputs and thence to other components of the SRP 120 as required, including the biometric authentication module. The routing module 124 may additionally receive and process input audio data from audio interface 128.

In one arrangement, registers 132 may comprise a bank of dedicated physically separate register banks. In other arrangements, registers 132 may comprise an area of general RAM dedicated in design or dynamically, e.g. on start-up or initialisation of device 100. Registers 132 may comprise a master-slave arrangement in which master registers are written as control data is received, then corresponding slave registers updated simultaneously on receipt of a further command. Some "register" bits may be implemented as local individual latches physically located close to the actual routing logic.

In one output signal path from the routing module 124, the SRP 120 comprises a digital signal processor (DSP) 126 configured to enhance the audio data in one or more ways. Those skilled in the art will appreciate that many algorithms may be carried out by the DSP 126 in order to enhance and amplify those portions of the audio data corresponding to the user's voice. The present disclosure is not limited to any particular algorithm or set of algorithms. For example, the DSP 126 may employ one or more noise reduction techniques to mitigate or cancel background noise and so increase the signal-to-noise ratio of the audio data. The DSP may use beamforming techniques to improve the quality of the audio data. In a further example, the DSP 126 may analyse and select for biometric authentication the audio data signal which is best for use in the biometric authentication process (e.g., the audio data signal having the highest signal to noise ratio). In general, these techniques require data from multiple microphones 112 and thus the routing module 124 may output audio data from multiple microphones via the signal path to the DSP 126.

Thus the signal path from microphones 112 may comprise multiple strands from the microphones to the DSP 126. Similarly, the output from the DSP 126 may comprise multiple strands, for example carrying information corresponding to different audio signal frequency bands. Thus the term signal path should be considered to denote the general flow of information from possibly multiple parallel sources to multiple parallel destinations, rather than necessarily a single wired connection for example. In some embodiments a portion of such a signal path may be defined in terms of controlled read and writes from a first defined set of memory locations to which input data has been supplied (e.g. from microphones 112) to a second defined set of locations in memory from which output data may be read by the next component in the signal path (e.g. by DSP 126 or biometric authentication module 160).

In a further output signal path from the routing module 124, the SRP 120 comprises a voice biometric authentication module 160. The voice biometric authentication module 160 may be implemented for example as a DSP (either the same DSP 126 that carries out audio enhancement, or a different DSP). The voice authentication module 160 carries out biometric authentication on the pre-processed audio data in order to generate an authentication result. Note that, in the illustrated embodiment, a dashed line shows a signal path from the DSP 126 back to the routing module 124, and then to the biometric authentication module 160. Thus a signal may be routed from the inputs 122 to the voice authentication module 160 via the DSP 126. In alternative embodiments, the routing module 124 may establish signal paths directly between the inputs 122 and the biometric authentication module 160 (i.e. without passing through the DSP 126), the DSP 126 may be arranged to pass enhanced audio data directly to the biometric authentication module 160 without passing through the routing module 124.

The biometric module 160 may have access to one or more databases allowing the user's voice to be identified from the audio data. For example, the authentication module 160 may communicate with a storage module 174 containing one or more templates or other data such as a Biometric Voice Print (BVP) allowing identification of the voices of one or more authorised users of the device 100. In the illustrated embodiment the BVP is stored in memory 174 outside the SRP 120. However, in other embodiments the BVP may be stored on a server that is remote from the device altogether or, conversely, stored on the SRP 120 itself.

The precise nature of the algorithm carried out in the authentication module 160 is not relevant for a description of the invention, and those skilled in the art will be aware of the principles as well as several algorithms for performing voice biometric authentication. In general, the process may involve a comparison of parameters derived from the acquired (and optionally pre-processed) audio data to corresponding parameters previously derived from a recording of an authorised user (e.g. through a biometric enrolment process) and stored in the storage module 174. These parameters may for instance be related to Mel-frequency cepstral coefficients (MFCC) of the audio data. The parameters previously acquired and corresponding to an authorised user may be called a biometric voice print (BVP). To allow a parallel relative comparison against a set of other users, the authentication module 160 may also access a universal background model (UBM) and/or a cohort model as part of the authentication process, and these may be stored together with the BVP in storage module 174, which may also store firmware used to run the algorithm in the SRP.

The biometric authentication module 160 generates an authentication result BioMatch which is provided to security module 172 which may output this result in the form of a message or signal containing an indication BioOK that the acquired audio data contains the voice of an authorised user of the device 100 (and thus one or more requested restricted operations may be carried out), or an indication that the acquired audio does not contain the voice of an authorised user of the device 100 (and thus one or more requested restricted operations should not be carried out). The messaging may be protected by some form of data authentication (not to be confused with biometric authentication), for example authenticated by some key. The protection may take the form of a FIDO protocol, which allows the message to be securely relayed to a remote server via the AP 150, without needing to be passed into the TEE 158.

Another signal path from the routing module 124 may pass audio data directly to an audio interface 128, to be output from the SRP 120. This allows audio data to be acquired by the microphones 112 and used by the device 100 in a normal way, e.g. as a video camera, a phone, etc. For example, the audio data output via the audio interface 128 may be provided to the AP 150.

Locating the voice biometric authentication on the SRP 120 together with the routing module 124 controlling its input data and any pre-conditioning by DSP 126 results in a system in which the biometric verification process is advantageously implemented on one integrated circuit, rather than say some aspects being performed on the AP 150 and being liable to corruption by malware (that is, malicious software that may have been installed on the device surreptitiously) or by other unintended interaction between biometric authorization and any of the multiple application processes that may be running on AP 150.

The audio data stream used for biometric authentication need never leave the SRP 120, making it harder for malicious parties to reverse engineer the biometric authentication algorithm in attempts to uncover any vulnerabilities.

Also any signal conditioning, possibly time-varying or adaptive, for example spectral equalization, of the microphone input signal by DSPs 126 prior to biometric authentication may be conveniently taken into account locally on-chip by the biometric authentication algorithm.

Co-integrating the voice biometric authentication on the SRP 120 rather than on the AP 150 also has an advantage in that, in some applications, the biometric authentication may be necessary to perform a "secure wake" of the device 100. Until a positive biometric authentication occurs, at least part of the AP 150 may be in a low-power dormant state. If the biometric authentication module 160 were on the AP, then a significant part of the circuitry on the AP 150 would need to be activated and consume power. To further reduce power, the biometric authentication module 160 may also be placed in a low-power state until voice activity detection circuitry on SRP 120 or other upstream or parallel voice activity detection circuitry detects the presence of voice components in the microphone signal.

The device 100 may be operable in a variety of "use cases", for example biometric authentication, biometric enrolment, listening, recording, playback, telephone voice call and so forth. These use cases may be requested by user input via an interface, such as a touch screen, or an external stimulus such as an externally originated telephone call. Each use case may be associated with particular signal paths established in the routing module 124, controlled by routing registers 132. In some situations there may be multiple use cases active concurrently. For example, during playback of audio files via the AP 150, audio interface 128 and the SRP 120 to loudspeakers (not illustrated), a use case of listening for voice commands may still be active.

In order to enter a particular use case, the AP 150 may first issue one or more control signals over the CIF 130, adapting the values stored in the routing registers 132 and so adapting the configuration of the routing module 124. Once the routing is established in the routing module 124, the AP 150 may then issue one or more further control signals to trigger entry to the use case and activate the modules or initiate the processing that is required by the particular use case.

In some embodiments, there may be a set of register settings defined for each anticipated use case. Each register setting may be stored in the storage module 174 or may be stored within a memory in the SRP 120. Transition to one of these use cases may be initiated by control signals from the AP 150 transmitted over the CIF 130. Thus, in establishing the routing required for a particular use case, the control signal may contain an instruction to amend the values stored in registers to correspond to the predefined set of register settings for that particular use case. In alternative embodiments, the AP 150 may control the values stored in the registers directly (i.e. without reference to a predefined set of register settings) in order provide a desired routing configuration.

Regardless of whether the routing module 124 is configured based on predefined sets of settings in the registers 132, the AP 150 may also be able to control the values in individual routing registers and so alter the configuration of the routing module 124. Particularly during authentication use cases, this presents a security risk as it is possible for the AP 150 to become infected with malware and so alter the routing module configuration to inject spoof audio signals to the biometric authentication module 160 (e.g. via the audio interface 128), or route genuine voice data signals used in authentication away from the SRP 120 for later use in spoofing attacks.

According to embodiments of the disclosure, the security module 172 is operable to detect the configuration of the routing module 124, and determine whether or not the configuration complies with one or more rules. If the configuration does not comply with one or more of the one or more rules, the security module 172 may generate a signal indicating that the routing configuration is insecure. The signal may be provided directly to a component of the SRP 120 which can act on the signal directly (e.g. by invalidating a biometric authentication result, or aborting a biometric authentication process, etc), or may be utilized to set a security status flag indicating that the routing configuration is insecure (or was insecure during a specified period). The security status flag may be provided at any memory location to which the security module 172 has access, such as the memory 170 for example.

Note that, as will be explained in greater detail below, the security module 172 may be operable to determine whether or not the routing configuration complies with a plurality of rules at any one time. In some embodiments, the routing configuration may be judged insecure (and the signal generated) if it fails to comply with just one of that plurality of rules; in other embodiments, the routing configuration may only be judged insecure if a subset (i.e. more than one) of the plurality of rules is broken, or if all of the rules are broken. Further, the rules may have different priorities. In such embodiments, a failure to comply with a single rule having relatively high priority may result in the routing configuration being deemed insecure, whereas a failure to comply with a single rule having relatively low priority may not result in the routing configuration being deemed insecure.

In the illustrated embodiment, the security module 172 is coupled to the routing registers 132 and can thus determine the routing module configuration by reading the values stored in those registers 132. In other embodiments, the security module 172 may determine the routing module 124 configuration by monitoring control signals issued by the AP 150 via the CIF 130. The security module 172 is additionally coupled to memory 170 storing configuration data such as the addresses of different ports in the SRP 120 as a whole and the routing configuration of routing module 124 in particular.

As noted above, the SRP 120 is operable in a plurality of operational modes, or "use cases". For example, the use cases may include one or more of: a biometric authentication mode (in which the biometric authentication module 160 is operable to perform a biometric authentication algorithm on input audio signals received at the inputs 122); a biometric enrolment mode (in which a user provides one or typically multiple voice samples, and a BVP is generated for the user and stored in the storage module 174); and a listening mode (in which the SRP 120 listens for the presence of a voice or a particular spoken passphrase or password before initiating biometric authentication). These use cases and others may be requested by user input via an interface, such as a touch screen, or an external stimulus such as an externally originated telephone call.

According to embodiments of the disclosure, each use case may be associated with a respective set of one or more rules to be applied by the security module 172 in determining whether the routing module configuration is secure or not. That is, a first use case may be associated with a first set of one or more rules, while a second use case may be associated with a second, different set of one or more rules. The sets of rules may overlap, such that a particular rule applied in one use case may also be applied in another use case. The set of rules applied to one use case may be identical to the set of rules applied in another use case; however, in general, at least one of the sets of rules will differ from at least one other set of rules.

Additionally, or alternatively, various security levels or security modes may be defined, each associated with a respective set of rules. In embodiments with use cases, each use case may then be associated with one of the security modes, e.g. the security mode associated with the relevant set of rules for that use case. Where there are concurrent use cases, the most restrictive (i.e. the more secure) security mode of those associated with each of the concurrent use cases may be selected to define the set of rules employed. In other embodiments, the sets of rules may be associated only with the use cases (and no separate security levels are defined).

According to different embodiments, the security module 172 may determine that the rules are not complied with (i.e. that the routing is not secure) if one of the one or more rules is not complied with, or if a predetermined number of the rules are not complied with, or if all of the rules are not complied with. In the following description, it will be assumed that a failure to comply with one rule (that is, a single rule) of the one or more rules applied by the security module 172 will result in the routing configuration being deemed insecure and the security status flag being set accordingly.

Figure 3:
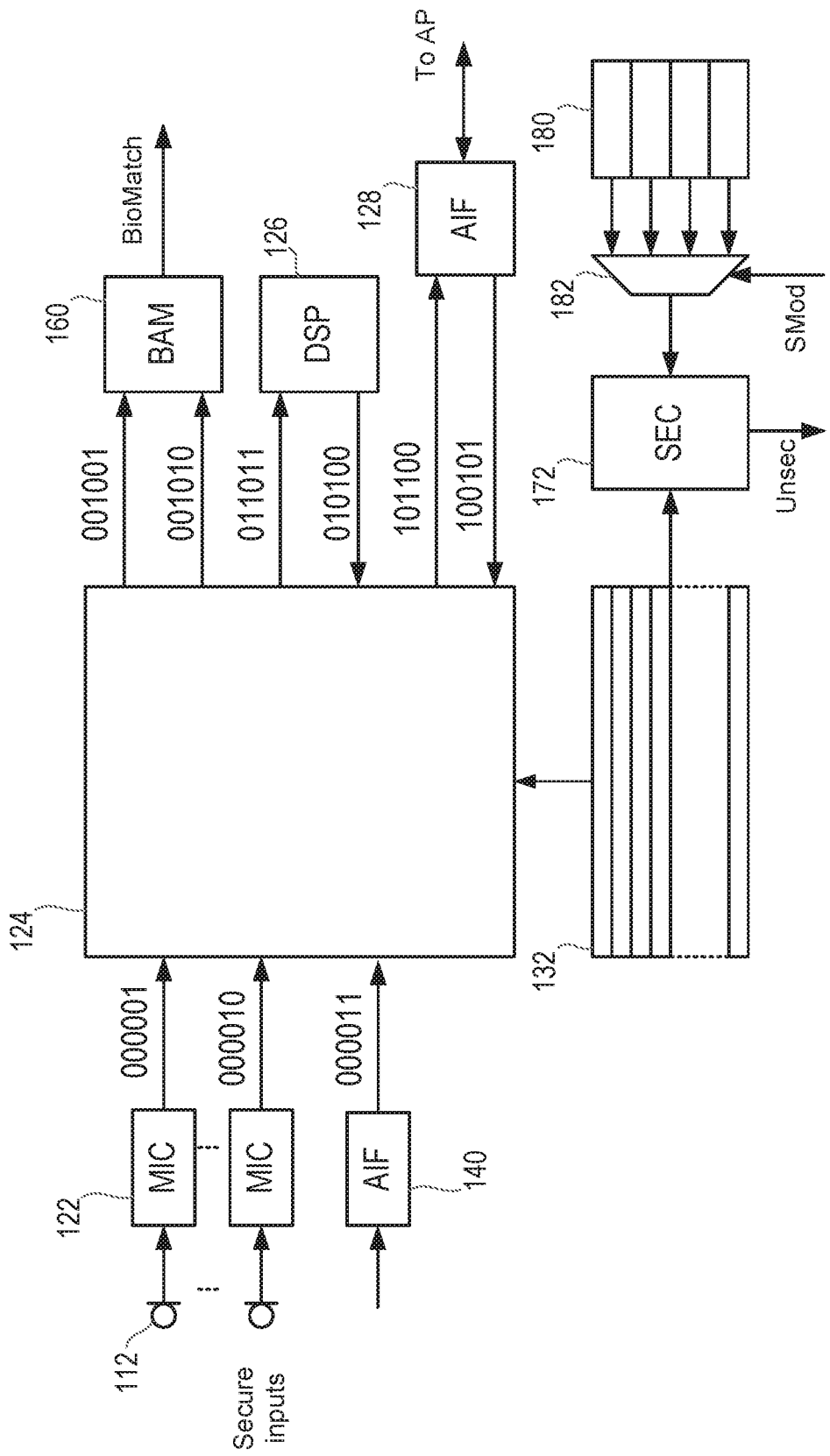
FIG. 3 is a schematic diagram showing in more detail a routing module according to embodiments of the disclosure.

FIG. 3 is a schematic diagram showing the operation of the security module 172 and the routing module 124 in more detail.

As described above, the routing module 124 comprises one or more inputs and one or more outputs, and is operable to enable signal paths between those inputs and outputs, for example, in dependence on the values stored in routing registers 132. In some configurations, the routing module 124 may enable signal paths between a single input and multiple outputs, such that the same signal is propagated to multiple outputs. In some configurations, the routing module 124 may enable signal paths between multiple inputs and a single output, such that multiple signals are mixed on to a single output. Of course, in some configurations, the routing module 124 may enable a signal path between a single input and a single output. Routing module configurations may comprise one or more of these enabled signal paths.

Each input and output is given a respective address, as shown in the illustration. Thus, in the illustrated embodiment, the routing module has two inputs from respective microphone inputs 122 (000001 and 000010), an input from DSP 126 (010100), an input from the audio interface 128 (100101) and an input from a second audio interface 140 (000011). The second audio interface 140 is not illustrated in FIG. 2, but may provide an interface for audio signals from a dedicated audio chip (such as an audio codec, for example). The routing module 124 has two outputs to the biometric authentication module 160 (001001 and 001010), an output to the DSP 126 (011011) and an output to the first audio interface 128 (101100). These addresses and labels may be stored in the memory 170 and accessible to the security module 172.

The routing module 124 may also apply gain to one or more of the signals. For example, in a configuration in which the signal paths between respective MIC inputs and respective authentication module inputs are enabled (i.e. each microphone 112 captures corresponding voice signals), the routing module 124 may be configured to apply a gain of 0.5 to each microphone signal so as to provide a mixed or summed signal to the authentication module 160 that does not exceed the full-scale amplitude.

It will be apparent that the particular inputs, outputs, and their respective addresses are shown as an example only. Different inputs, different outputs, and different addresses may be provided and still fall within the scope of the claims appended hereto.

As noted above, according to embodiments of the disclosure, the security module 172 is operable to determine whether the routing module 124 configuration complies with one or more rules. Different sets of rules may apply in different modes of operation, or use cases, of the SRP 120. For example, the security module 172 may determine which of the signal paths in the routing module configuration is enabled (i.e. actively connected) and whether those signal paths are permitted in a given use case or not. Thus, the security module 172 is operable to determine the routing module configuration (for example by accessing the routing registers 132, as shown in FIG. 3). The security module 172 is further operable to determine the rules applicable to the current use case. For example, security module 172 may have access to a configuration module 180 storing respective sets of rules for each use case or security mode, via a selection module 182 acting under the control of a control SMod defining the current use case (for example received from the AP 150). The security module 172 may then be operable to generate a signal ("Unsec") indicating that the routing configuration is insecure responsive to a determination that the one or more rules have not been complied with.

One or more of the inputs to the SRP 120 may be deemed secure, in that it is not possible to tamper with (i.e. add to, replace, or otherwise alter) the signals present on those inputs. Thus an input may be deemed secure if there is no component or connection to a component in the signal path that is upstream of the input, where that component is modifiable by software running outside the SRP 120 (e.g. whether the software is running on the upstream component itself or another device coupled to the upstream component). For example, in the embodiments illustrated in FIG. 2, each of the microphone inputs 122 may be deemed secure in that they are connected directly to the microphones 112 only, i.e. no components other than the microphones 112 are connected to the inputs 122. Conversely, the audio interface 128 may not be deemed secure, as it is connected to the AP 150. As discussed above, it is possible for the AP 150 to become infected with malware. Thus signals from the audio interface 128 (i.e. received from the AP 150) may not be trusted for all purposes and the audio interface 128 not deemed secure.

Secure inputs may not be limited to the microphone inputs 122. For example, one or more other inputs (such as the audio interface 140) may be deemed secure by virtue of the electrical connections within the device 100. For example, if audio interface 140 is connected to a separate integrated circuit (such as a dedicated audio circuit, or codec), and the separate integrated circuit was coupled only to input/output components such as microphones, cameras or the like (i.e. not coupled to components that are susceptible to infection with malware such as the AP 150), then the audio interface 140 may be deemed secure. In other arrangements, for example where the audio interface 140 is coupled to one or more components that are susceptible to infection with malware, the audio interface 140 may be deemed insecure.

Thus the designer of the device 100 (and particularly the electrical connections within the device 100) may define a list of secure inputs and store that list at a location that is accessible by the security module 172 (e.g. the memory 170). In certain modes of operation or use cases, the security module 172 may be operable to determine whether certain signal paths originating at insecure inputs are enabled or not. For example, when the authentication module 160 is active and applying a biometric authentication algorithm to an input audio signal, it may be desirable to ensure that signal paths terminating at the authentication module 160 inputs (i.e. 001001 and 001010) originate only from secure inputs (i.e. one or more of microphone inputs 122 and audio interface 140).

Note that, in determining the enabled signal paths and particularly the origins of those signal paths, the security module 172 may need to traverse multiple inputs and outputs of the routing module 124. For example, a signal path may be enabled between the output of the DSP 126 (010100) and one of the authentication module inputs (e.g. 001001). In order to determine whether this signal originated at a secure input, the security module 172 may need to determine the routing to the input to the DSP 126. If a signal path is enabled between the audio interface 128 input (100101) and the input to the DSP 126 (011011), this may be an indication that the signal path terminating at the authentication module input (001001) did not originate at a secure input and is therefore insecure. Where DSP 126 may have multiple active inputs and multiple active outputs it may not be possible to determine precisely which input signals contribute to or affect which signal outputs. In such a scenario, the security module 172 may deem the signal routing configuration insecure if any one of the inputs to DSP 126 receives a signal which originates from an input other than a secure input. In some embodiments, there may be a plurality of DSPs 126, with pre-processing of signals for the biometric authentication module performed in one DSP and processing of signals en route to other destinations performed in a different DSP to avoid this ambiguity while still allowing the required processing.

FIG. 3 shows one particular embodiment in which the security module 172 accesses respective sets of rules for each use case stored in a configuration module 180. However, this is only one possible implementation. In other implementations, for example, the rules may be embodied in a finite state machine (which may be coded in software) having states representing each of the supported use cases. The security module 172 may determine whether the routing configuration complies with all possible rules, and maintain flags reflecting whether a particular rule is complied with. Upon instruction to transition to a new use case, the flags maintained by the security module 172 can be used to determine whether the routing configuration complies with the rules for the particular use case.

Figure 4:
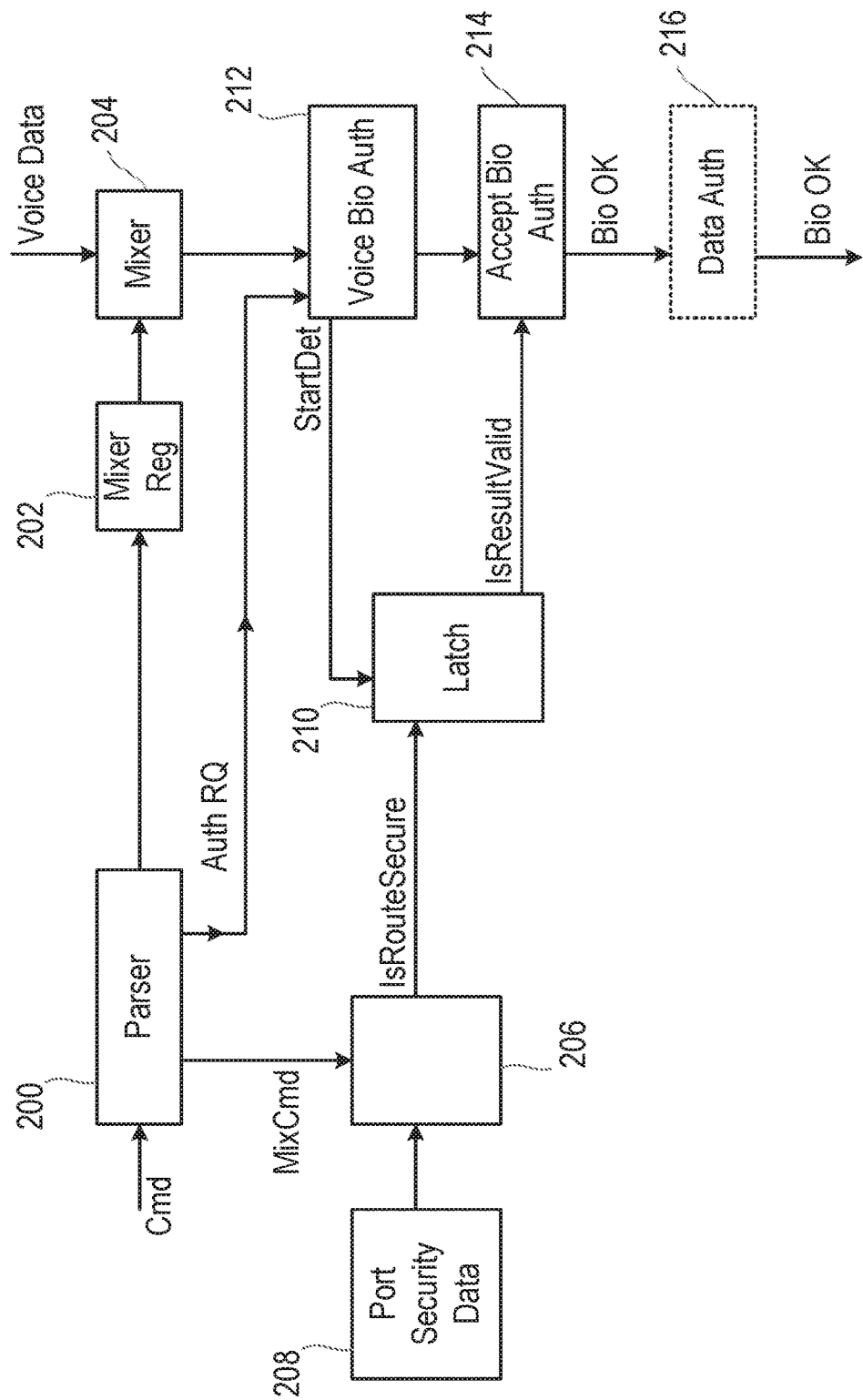
FIG. 4 shows processing of voice input in a biometric authentication mode according to embodiments of the disclosure.

As noted above, one of the use cases applicable in the SRP 120 may be a biometric authentication mode, in which the biometric authentication module 160 is controlled to carry out a biometric authentication algorithm on an audio signal and provide an authentication result (i.e. an indication as to whether a voice contained within the audio signal is that of an authorised user or not). FIG. 4 shows processing of voice input in a biometric authentication mode according to embodiments of the disclosure.

Control signals ("Cmd") are received and interpreted by a parser module 200. For example, the control signals may be received from the AP 150 over the control interface 130. The parser module 200 may be implemented in a control processor in the SRP 120 (not illustrated separately in FIG. 2, but may be implemented within the control interface 130).

The control signals may comprise instructions to alter the values stored in routing registers 202 (corresponding to routing registers 132), and so alter the signal paths that are enabled within a mixer/router module 204 (corresponding to routing module 124). The parser module 200 may interpret such control signals and generate corresponding write instructions to the routing registers 202.

The control signals may comprise instructions to enter a particular mode of operation or use case, either explicitly or implicitly for example by a command to activate the biometric authentication module. The parser module 200 may interpret such control signals and forward an indication ("MixCmd") of the use case to a security module 206 (corresponding to security module 172). The security module 206 is able to access a port security data module 208, which contains data such as the addresses of one or more inputs and one or more outputs connected to the mixer/router module 204, which ones of the inputs may be regarded as secure microphone inputs, and one or more rules to be applied in each of a plurality of different modes of operation, for instance as defined with respect to an associated security mode.

The security module 206 is operable to access the one or more rules associated with the mode of operation specified in the MixCmd signal, and to determine whether the configuration of the mixer/router module 204 (e.g. through accessing the routing registers 202) complies with those one or more rules. For example, the security module 206 may determine whether the configuration complies with the one or more rules upon receipt of the MixCmd signal. Additionally, the security module 206 may continue to determine whether the configuration complies with the one or more rules until further notice, i.e. until a further control signal is received specifying that the mode of operation no longer applies, or an event (such as the completion of an authentication process) has occurred.

The security module 206 outputs a control signal ("IsRouteSecure") specifying whether the routing module configuration complies with the one or more rules, to a latch module 210. The IsRouteSecure signal may take a first value, e.g. "True", if the routing module configuration complies with the one or more rules, and a second, different value, e.g. "False", if the routing module configuration does not comply with the one or more rules. Latch module 210 serves to deliver an output signal IsResultValid indicating whether the IsRouteSecure signal indicated compliance to the rules, e.g. was True, for the whole of a time duration that started with receipt of a control signal StartDet. If IsRouteSecure is initially False when StartDet is received or initially True but then later False, then IsResultValid will be set False, even if the routing configuration returned to a secure state and IsRouteSecure returned to a True state before the end of the period. During the time duration, the latch module 210 thus latches to a negative or False value upon receipt of a negative or False IsRouteSecure signal from the security module 206.

True and False may be represented by logic high and low levels, in which case the latch module 210 may be a standard logic latch circuit. In some embodiments True or False signals may take the form of pulses or edges, with an appropriately designed latch circuit. Alternatively, True and False may take the form of digital messages to be handled by software on a processor.

In further embodiments, the latch module 210 may take the form of a memory, or memory location, that indicates whether the routing configuration complied with the rules for the whole of a time duration that started with receipt of the control signal StartDet. For example, the memory may comprise a flag indicating whether or not the routing configuration was secure throughout the time duration.

In the illustrated embodiment, the mode of operation specified in the MixCmd signal may be a biometric authentication mode. Thus, audio signals are provided via the mixer/router module 204 to a voice biometric authentication module 212 (e.g. corresponding to the module 160), and module 212 outputs a biometric authentication result indicating whether a voice contained within the audio signals corresponds to that of an authorised user. The result is provided to an accept authentication result module 214, which will be described in greater detail below.

One of the control Cmd signals may comprise a request to commence biometric authentication. The parser module 200 may interpret such control signals and provide a control signal ("Auth RQ") to activate the authentication module 212.

For the biometric authentication to be secure, according to embodiments of the disclosure, it may be desired that signal paths terminating at the input to a biometric authentication module 212 originate only from the secure inputs (e.g. the microphone inputs 122). For example, in that case, the security module 206 may be operable to determine whether the routing module configuration is such that signal paths terminating at the biometric authentication module inputs originate from one of a plurality of predefined inputs (such as the inputs 122). If one or more signal paths terminating at the biometric authentication module inputs do not originate from a predefined secure input, the security module 206 may determine that the routing module configuration does not comply with the one or more rules, issuing the IsRouteSecure signal. Note that the DSP 126 may be used in the biometric authentication mode to enhance the audio signal provided at the inputs 122 in one or more ways, as described above. Thus the DSP 126 may be provided within signal paths that terminate at the biometric authentication module inputs; however, for compliance with the rule the signal paths must originate at a secure input.

In some embodiments, it may also be desirable for the audio signals used in the biometric authentication process to be kept on the SRP 120, so as to prevent copying of the signals for later use in spoofing attacks. In these embodiments, the security module may therefore be operable to determine whether the routing module configuration is such that any signal path originating at the inputs 122 terminates at an output interface of the SRP 120 (e.g. the AIF 128). If one or more signal paths originating at the inputs 122 terminate at an output interface of the SRP 120, the security module 206 may again determine that the routing module configuration does not comply with the one or more rules (and so generate a negative or FALSE IsRouteSecure signal). Defined more strictly, the security module 206 may be operable to determine whether the routing module configuration is such that any signal path originating at the inputs 122 terminates at a node other than an input of the biometric authentication module. If so, the security module 206 may deem that the configuration does not comply with the one or more rules.

Upon detection of voice activity (or detection of a voice trigger such as a particular password or passphrase), the authentication module 212 may issue a control signal ("StartDet") to the latch module 210 or security module 206. The control signal indicates that the critical voice authentication process is taking place and that the routing configuration must now be secure and comply with the one or more rules. If, upon receipt of the StartDet signal, the IsRouteSecure signal is set to indicate that the configuration does not comply, the latch module 210 may output to the accept authentication module 214 a signal ("IsResultValid") indicating that the configuration did not comply with the one or more rules at some point during the critical period. In the event that the configuration does comply with the one or more rules, the security module 206 may continue to detect whether the configuration complies with those rules (e.g. by monitoring the registers 202 or by monitoring for further control signals changing the values stored in the registers) and updates the latch module 210 as appropriate. Upon generation of the negative or FALSE IsRouteSecure signal, the latch module outputs an appropriate IsResultValid control signal to indicate that fact to the accept authentication module 214. If the configuration is found not to comply with the one or more rules at any time during the critical period following receipt of the StartDet signal, the IsResultValid signal indicates that the configuration did not comply with the one or more rules.

Thus in some embodiments, the security module 206 is operative to determine whether the routing module configuration complies with one or more rules upon initiation of and throughout the biometric authentication process.

In the event that the configuration complies with the one or more rules and the IsResultValid signal indicates that fact to the accept authentication module 214, the authentication result can be deemed valid and the accept authentication module 214 forwards the biometric authentication result to a data authentication module 216 that is operable to authenticate the result (e.g. apply a digital signature) and output the authenticated result from the SRP 120 and/or the device 100. For example, the data authentication module 216 may apply authentication techniques meeting the FIDO protocols.

If the IsResultValid signal indicates that the configuration did not comply with the one or more rules, the accept authentication module 214 may take one of a number of different actions according to different embodiments. For example, in some embodiments, the accept authentication module 214 may invalidate the authentication result, e.g. setting the result to a negative result (even if it was initially positive), or to a third, invalid result. In other embodiments, the accept authentication module 214 may append the authentication result with an indication that the routing configuration was insecure or invalid during the authentication process. The requesting party (e.g. the AP 150, a third party, etc) may then handle the authentication result as desired, either invalidating it or taking some other measure.

In further embodiments, the latch module 210 may be operable to abort the authentication process directly by issuing an appropriate control signal to the authentication module 212 in the event that the routing configuration is found not to comply with one or more rules.

Figure 5:
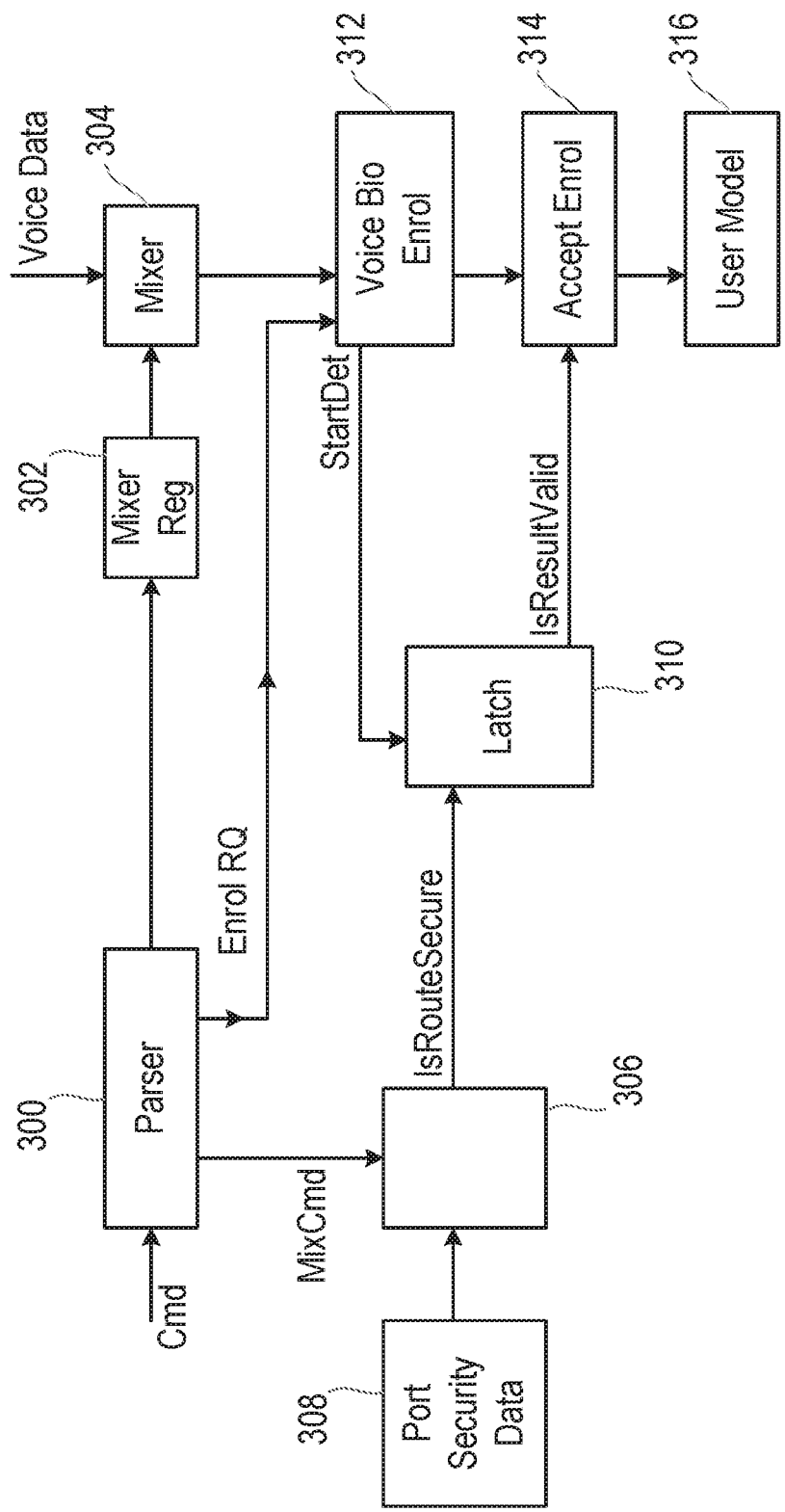
FIG. 5 shows processing of voice input in a biometric enrolment mode according to embodiments of the disclosure.

As noted above, one of the use cases applicable in the SRP 120 may be a biometric enrolment mode. In this use case, a user may be required to speak into the microphones 112 for a period of time so that the biometric parameters of his or her voice can be captured and a unique BVP generated. The user may be required to read a particular passage or speak particular words multiple times in order to adequately capture the biometric parameters. FIG. 5 shows module processing of voice input according to embodiments of the disclosure in a biometric enrolment mode. Modules 300, 302, 304, 306, 308 and 310 are similar to their corresponding counterparts in FIG. 4.

In the illustrated embodiment, therefore, the mode of operation specified in the MixCmd signal may be a biometric enrolment mode. Thus, audio signals are provided via the mixer/router module 304 to a voice biometric enrolment module 312 (e.g. corresponding to the module 160), and module 312 analyses the audio signals and generates a biometric voice print corresponding to the voice of the user contained within the audio signals. The BVP, or an indication that the BVP has been created, is provided to an accept enrolment module 314, which will be described in greater detail below.

One of the control Cmd signals may comprise a request to commence biometric enrolment. The parser module 300 may interpret such control signals and provide a control signal ("Enrol RQ") to activate the enrolment module 312.

For the biometric enrolment to be secure, according to embodiments of the disclosure, it may be desired that the audio signals used in the biometric enrolment process not leave the SRP 120, so as to prevent copying of the signals for later use in spoofing attacks. In these embodiments, the security module 306 may therefore be operable to determine whether the routing module configuration is such that any signal path originating at the inputs 122 terminates at an output interface of the SRP 120 (e.g. the AIF 128). If one or more signal paths originating at the inputs 122 terminate at an output interface of the SRP 120, the security module 306 may determine that the routing module configuration does not comply with the one or more rules (and so generate a negative or FALSE IsRouteSecure signal). Defined more strictly, the security module 306 may be operable to determine whether the routing module configuration is such that any signal path originating at the inputs 122 terminates at a node other than an input of the biometric authentication module. If so, the security module 306 may deem that the configuration does not comply with the one or more rules.

It may also be desired that signal paths terminating at the input to the biometric enrolment module 312 originate only from the secure inputs (e.g. the microphone inputs 122). For example, in that case, the security module 306 may be operable to determine whether the routing module configuration is such that signal paths terminating at the biometric enrolment module inputs originate from one of a plurality of predefined inputs (such as the inputs 122). If one or more signal paths terminating at the biometric enrolment module inputs do not originate from a predefined secure input, the security module 306 may determine that the routing module configuration does not comply with the one or more rules, issuing the negative IsRouteSecure signal. Note that the DSP 126 may be used in the biometric enrolment mode to enhance the audio signal provided at the inputs 122 in one or more ways, as described above. Thus the DSP 126 may be provided within signal paths that terminate at the biometric enrolment module inputs; however, for compliance with the rule the signal paths must originate at a secure input.

Similar to the biometric authentication mode, the negative or FALSE IsRouteSecure signal is generated upon a determination that the routing configuration does not comply with the one or more rules, and the IsResultValid signal generated accordingly.

If the IsResultValid signal indicates that the configuration did not comply with the one or more rules, the accept enrolment module 314 may invalidate the enrolment, e.g. by cancelling the enrolment or deleting the BVP generated as a result of the enrolment.

Figure 6:
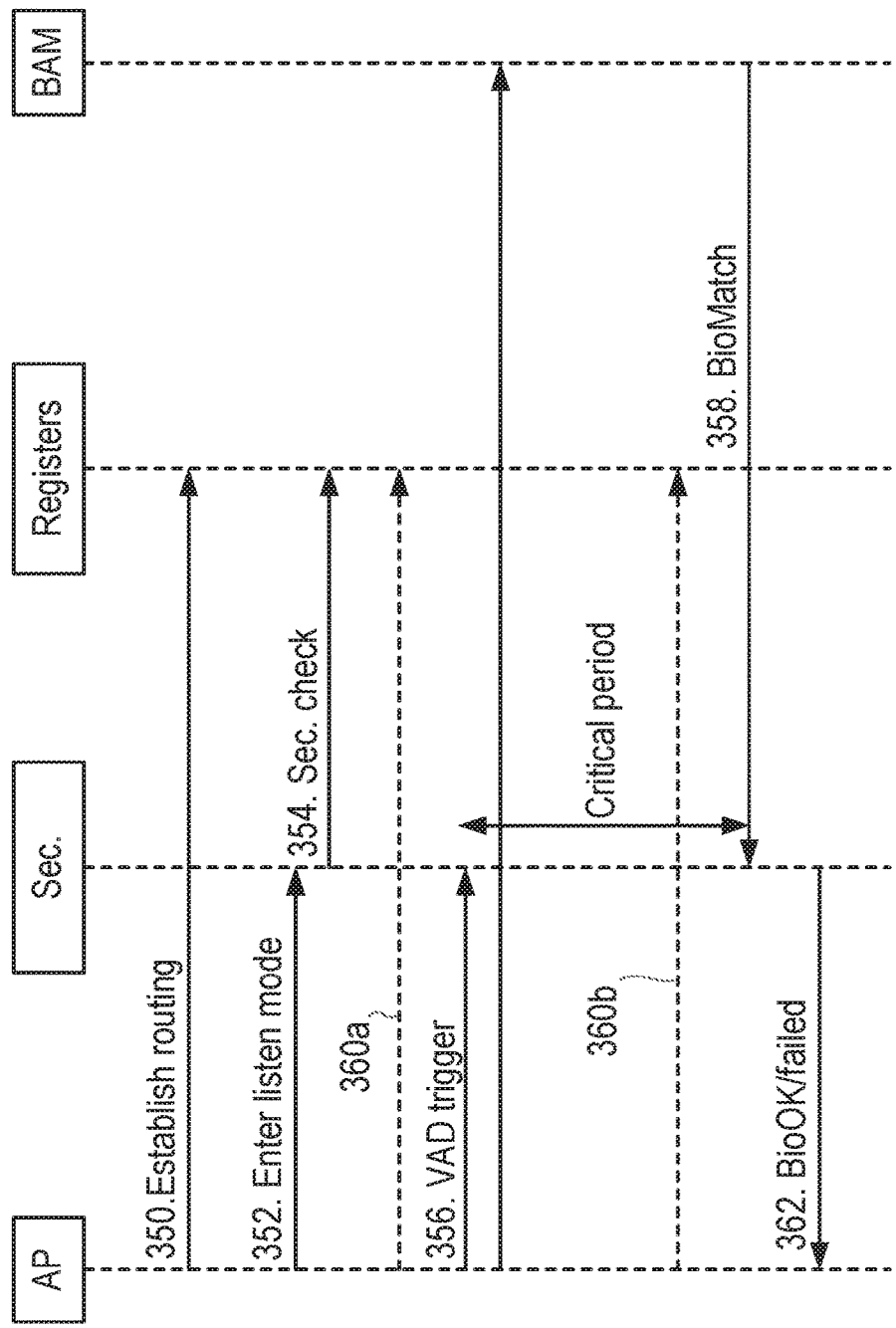
FIG. 6 is a timing diagram showing the processing of voice input in a listen mode according to embodiments of the disclosure.

As noted above, one of the modes of operation, or use cases, in which the SRP 120 may be operable is a listen mode, in which the SRP 120 listens for the presence of a voice or a particular spoken passphrase or password before initiating biometric authentication on that audio data. FIG. 6 is a signalling diagram showing the processing of voice input in a listen mode according to embodiments of the disclosure.

In step 350, the AP 150 establishes the routing module configuration, for example by sending appropriate control signals via the control interface 130 and altering the values stored in routing registers 132.

In step 352, once the routing is established, the AP 150 sends a control signal to set the mode of operation in the SRP 120 (and in particular the security module 172) to listen mode.

In the illustrated embodiment, the security module 172 immediately carries out a security check (step 354) on the routing module configuration to determine whether it complies with one or more rules, for example by accessing the registers 132. If the configuration does not comply with the one or more rules, the mode of operation may fail immediately. For example, the security module 172 may issue a failure control signal to the AP 150. If the configuration complies with the one or more rules, then the method may continue.

In further embodiments, the security module 172 may not carry out any security check upon entry to the listen mode use case, but may instead check the routing configuration only during a critical period (see step 356 below).

In step 356, the AP 150 (or in some embodiments other circuitry) detects the presence of voice activity in the audio signal provided to it (e.g. via the routing module 124), and issues a trigger signal to the security module 172 and the authentication module 160. In other embodiments, the trigger signal may be issued upon detection of the presence of a particular password or passphrase, rather than any voice activity. The trigger signal to the security module 172 indicates the beginning of a critical period in which the routing configuration must be secure (i.e. comply with the respective one or more rules for the biometric authentication use case). The security module 172 may carry out further checks on the routing module configuration throughout the critical period, or monitor for the presence of any changes to the routing configuration during the critical period. The trigger signal to the authentication module 160 may instruct the authentication module 160 to commence authentication (i.e. to carry out an authentication algorithm on the audio signal and generate a corresponding authentication result).

Once the authentication algorithm is complete, the authentication module 160 generates an authentication result ("BioMatch") and outputs it to the security module 172. This marks the end of the critical period. The security module is then able to determine whether the routing module configuration complied with the one or more rules during the critical period. If the configuration complied, then in step 362 the security module 172 can output the authentication result ("BioOK") to the AP 150. The result may be authenticated, as described above.

However, one or more control signals 360a, 360b may have been issued to modify the routing module configuration after the SRP 120 entered listen mode. This may be a valid and innocuous action to activate some desired concurrent use case, or may occur, for example, if the AP 150 has become infected with malware. If the security module 172 finds that the modified routing configuration failed to comply with the one or more rules, for example at the outset of the critical period due to a control signal 360a, or during the critical period due to a control signal 360b, the security module 172 generates a control signal to that effect (which may be used, for example, to set a security status flag). The authentication result BioMatch may be failed as a result (e.g. amended to negative or aborted), or appended with an indication that the routing module configuration failed the one or more rules.

For the biometric authentication to be secure, according to embodiments of the disclosure, it may be desired that signal paths terminating at the input to a biometric authentication module 160 originate only from the secure inputs (e.g. the microphone inputs 122) during the critical period. For example, in that case, the security module 172 may be operable to determine whether the routing module configuration is such that signal paths terminating at the biometric authentication module inputs originate from one of a plurality of predefined inputs (such as the inputs 122). If one or more signal paths terminating at the biometric authentication module inputs do not originate from a predefined secure input, the security module 172 may determine that the routing module configuration does not comply with the one or more rules, issuing the IsRouteSecure signal (so generating a negative compliance signal). Note that the DSP 126 may be used in the biometric authentication mode to enhance the audio signal provided at the inputs 122 in one or more ways, as described above. Thus the DSP 126 may be provided within signal paths that terminate at the biometric authentication module inputs; however, for compliance with the rule the signal paths must originate at a secure input.

In some embodiments, it may be desirable for the audio signals used in the biometric authentication process to be kept on the SRP 120 during the critical period, so as to prevent copying of the signals for later use in spoofing attacks. In these embodiments, the security module may therefore be operable to determine whether the routing module configuration is such that any signal path originating at the inputs 122 terminates at an output interface of the SRP 120 (e.g. the AIF 128). If one or more signal paths originating at the inputs 122 terminate at an output interface of the SRP 120, the security module 172 may again determine that the routing module configuration does not comply with the one or more rules (and so generate a suitable signal). Defined more strictly, the security module 172 may be operable to determine whether the routing module configuration is such that any signal path originating at the inputs 122 terminates at a node other than an input of the biometric authentication module. If so, the security module 172 may deem that the configuration does not comply with the one or more rules.

Figure 7:
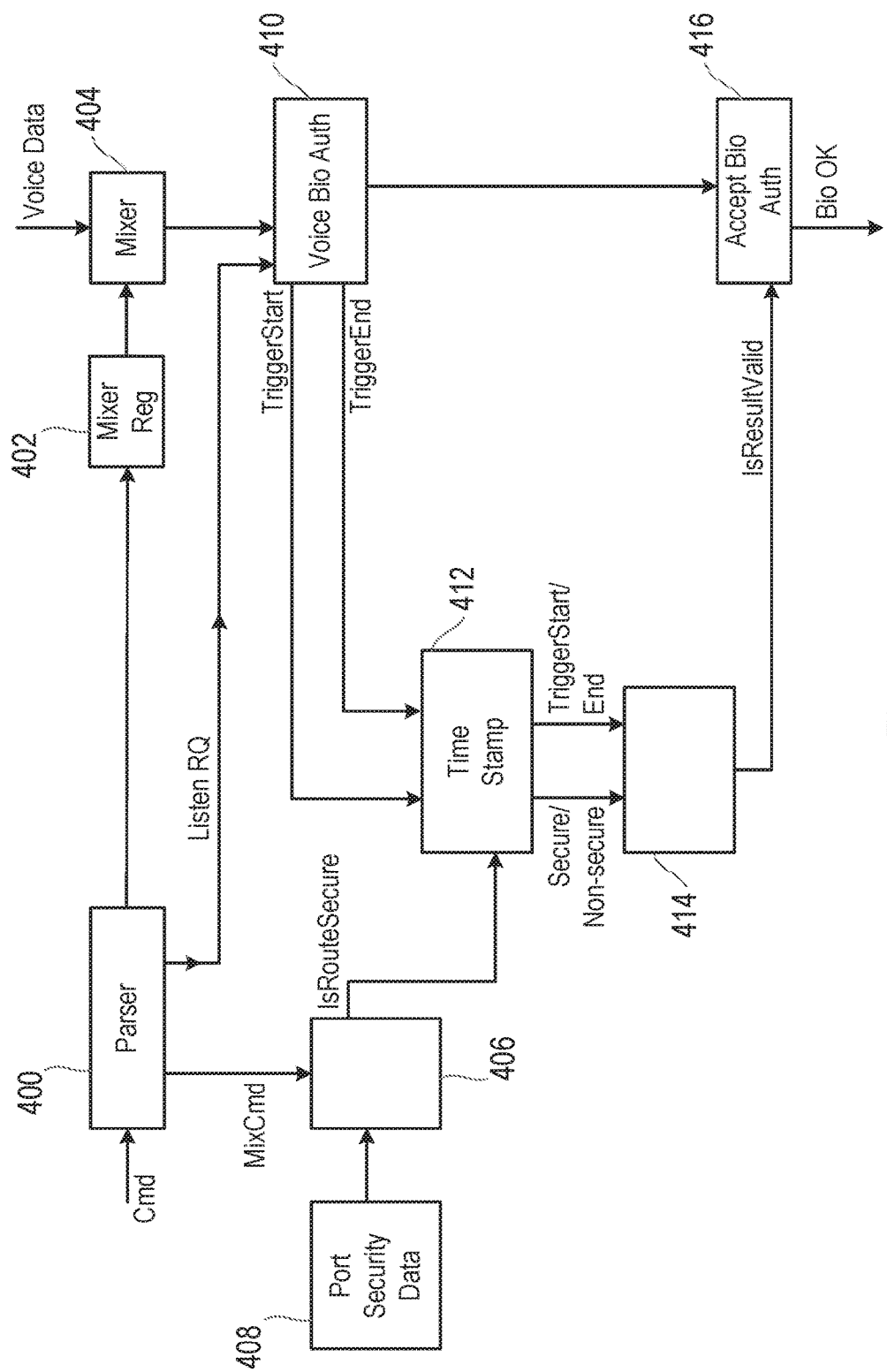
FIG. 7 shows processing of voice input in a listen mode according to embodiments of the disclosure.

FIG. 7 shows module processing of voice input in a listen mode according to embodiments of the disclosure.

In the illustrated embodiment, therefore, the mode of operation specified in the MixCmd signal may be a listen mode, in which the biometric authentication system listens to audio input signals for the presence of a particular trigger (such as a password or a passphrase), and then carries out biometric authentication on that trigger. Thus, audio signals are provided via the mixer/router module 404 to a voice biometric enrolment module 410 (e.g. corresponding to the module 160), and module 410 analyses the audio signals and generates a biometric authentication result indicating whether the voice that uttered the trigger corresponds to an authorised user of the system. The authentication result, or an indication that the authentication result has been generated, is provided to an accept biometric authentication module 416, which will be described in greater detail below.

One of the control Cmd signals may thus comprise a request to enter a listen mode. The parser module 400 may interpret such control signals and provide a control signal ("Listen RQ") to the biometric authentication module 410 instructing the biometric authentication module 410 to listen for the presence of the trigger in the audio input signals. In the illustrated embodiment, a trigger detect module is implemented within the biometric authentication module 410, such that the module 410 can listen for the presence of the trigger in the audio signal. However, in other embodiments a separate trigger detect module may be provided (e.g. in the SRP 120 or the AP 150), to monitor for the presence of a trigger word or phrase in the audio signals.

The security module 406 outputs a control signal ("IsRouteSecure"), specifying whether the routing module configuration complies with one or more rules specified in the port security data module 408 for the listen mode, to a time stamp module 412. The IsRouteSecure signal may take a first value, e.g. "True", if the routing module configuration complies with the one or more rules, and a second, different value, e.g. "False", if the routing module configuration does not comply with the one or more rules.

For the biometric authentication to be secure, according to embodiments of the disclosure, it may be desired that signal paths terminating at the input to a biometric authentication module 410 originate only from the secure inputs (e.g. the microphone inputs 122). For example, in that case, the security module 406 may be operable to determine whether the routing module configuration is such that signal paths terminating at the biometric authentication module inputs originate from one of a plurality of predefined inputs (such as the inputs 122). If one or more signal paths terminating at the biometric authentication module inputs do not originate from a predefined secure input, the security module 406 may determine that the routing module configuration does not comply with the one or more rules, issuing a corresponding IsRouteSecure signal. Note that the DSP 126 may be used in the biometric authentication mode to enhance the audio signal provided at the inputs 122 in one or more ways, as described above. Thus the DSP 126 may be provided within signal paths that terminate at the biometric authentication module inputs; however, for compliance with the rule the signal paths must originate at a secure input.

In some embodiments, it may also be desirable for the audio signals used in the biometric authentication process to be kept on the SRP 120, so as to prevent copying of the signals for later use in spoofing attacks. In these embodiments, the security module 406 may therefore be operable to determine whether the routing module configuration is such that any signal path originating at the inputs 122 terminates at an output interface of the SRP 120 (e.g. the AIF 128). If one or more signal paths originating at the inputs 122 terminate at an output interface of the SRP 120, the security module 406 may again determine that the routing module configuration does not comply with the one or more rules (and so generate a negative or FALSE IsRouteSecure signal). Defined more strictly, the security module 406 may be operable to determine whether the routing module configuration is such that any signal path originating at the inputs 122 terminates at a node other than an input of the biometric authentication module. If so, the security module 406 may deem that the configuration does not comply with the one or more rules.

The time stamp module 412 applies a time stamp to the IsRouteSecure signal, indicating a time at which the routing configuration was secure or non-secure (as the case may be), and outputs a corresponding signal to an evaluation module 414. Although illustrated as a separate module in FIG. 7, the evaluation module 414 may be implemented within the security module 406 (i.e. within the module 172).

The security module 406 may be configured to evaluate the routing module configuration and generate an IsRouteSecure signal upon entry to the listen mode, and upon every subsequent change to the routing module configuration while the system operates in the listen mode. Thus the evaluation module 414 receives at least one, and potentially multiple, signals from the time stamp module 412 indicating the times at which the routing module configuration was secure or non-secure.

Upon detection of the trigger in the audio input signal, the biometric authentication module 410 generates a trigger signal ("TriggerStart") and outputs the trigger signal to the time stamp module 412. The time stamp module 412 applies a time stamp to the trigger signal, indicating the time at which the trigger phrase started, and outputs a corresponding signal to the evaluation module 414. The biometric authentication module 410 may also begin to store, or buffer, the audio input signal and generate a corresponding authentication result.

Upon detection that the trigger has ended, or that sufficient audio data has been captured to evaluate whether the speaker is an authorised user and generate a biometric authentication result, the biometric authentication module 410 outputs a corresponding "TriggerEnd" signal to the time stamp module 412. The time stamp module 412 applies a time stamp to the trigger signal, indicating the time at which the trigger phrase ended, and outputs a corresponding signal to the evaluation module 414. Once the biometric algorithm is complete, the biometric authentication module 410 also outputs an authentication result to an accept biometric authentication result module 416, indicating whether the speaker of the trigger is an authorised user of the system or not.

The evaluation module 414 thus has all relevant data to determine whether the routing module configuration was secure during the critical phase between the start of the trigger phrase and the end of the trigger phrase. Upon receipt of the TriggerEnd signal, the evaluation module 414 thus determines whether the routing module configuration was secure (as indicated by the IsRouteSecure signal) throughout the entire critical phase (i.e. indicated by the time stamps associated with the TriggerStart and TriggerEnd signals), and outputs a corresponding IsResultValid signal to the accept biometric authentication module 416. If the routing module configuration was non-secure at any point during the critical phase (i.e. whether or not the configuration was subsequently changed to be secure), the IsResultValid signal may be false, or negative. If the routing module configuration was secure throughout the critical phase, the IsResultValid signal may be true, or positive.

In the event that the routing module configuration complies with the one or more rules and the IsResultValid signal indicates that fact to the accept biometric authentication module 416, the authentication result can be deemed valid and the accept biometric authentication module 416 may forward the biometric authentication result to a data authentication module (not illustrated) that is operable to authenticate the result (e.g. apply a digital signature) and output the authenticated result from the SRP 120 and/or the device 100. For example, the data authentication module may apply authentication techniques meeting the FIDO protocols.

If the IsResultValid signal indicates that the configuration did not comply with the one or more rules, the accept biometric authentication module 416 may take one of a number of different actions according to different embodiments. For example, in some embodiments, the accept biometric authentication module 416 may invalidate the authentication result, e.g. setting the result to a negative result (even if it was initially positive), or to a third, invalid result (i.e. neither positive nor negative, but invalid). In other embodiments, the accept biometric authentication module 416 may append the authentication result with an indication that the routing configuration was insecure or invalid during the critical phase. The requesting party (e.g. the AP 150, a third party, etc) may then handle the authentication result as desired, either invalidating it or taking some other measure.

The devices described above have focussed primarily on voice biometric authentication based on audio input received from one or more microphones. However, those skilled in the art will appreciate that the invention may be applied in a more general sense to any biometric authentication system in which malware can hijack the signal path from an input device to a biometric authentication device. For example, the invention is also applicable to iris or retinal recognition (in which case the input device or devices are cameras, and the authentication module carries out iris or retinal recognition); fingerprint recognition (in which case the input device or devices are cameras or fingerprint detectors, and the authentication module carries out fingerprint recognition); palm vein recognition (in which case the input device or devices are cameras, and the authentication module carries out palm vein pattern recognition); and face recognition (in which case the input device or devices are cameras, and the authentication module carries out face recognition).

Embodiments of the invention thus provide methods and apparatus ensuring that a biometric authentication process can be carried out in an electronic device without interference from other components of the device, such as may occur when the device has become infected with malware for example. The invention may provide a codec or speaker recognition processor, coupled to receive biometric input data, comprising a security module that determines whether a routing configuration complies with one or more rules. The security module may be implemented to prevent genuine biometric data from being output from the speaker recognition processor, and to prevent spoof biometric data from being inserted into the authentication module.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may comprise or be comprised in an electronic device, especially a portable and/or battery powered electronic device such as a mobile telephone, an audio player, a video player, a PDA, a wearable device, a mobile computing platform such as a laptop computer or tablet and/or a games device, remote control device or a toy, for example, or alternatively a domestic appliance or controller thereof including a domestic temperature or lighting control system or security system, or robot.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope. Terms such as amplify or gain include possibly applying a scaling factor of less than unity to a signal.

The invention claimed is:

1. A biometric authentication system, comprising:
   one or more inputs, for receiving biometric input signals from a user;
   a biometric authentication module having one or more biometric authentication module inputs, and being configured to carry out biometric authentication of signals received at the one or more biometric authentication module inputs and generate an authentication result;
   a control interface, for receiving one or more control signals from an application processor;
   a routing module, having a set of routing inputs and a set of routing outputs, at least one of the routing inputs being coupled to the one or more inputs and at least one of the routing outputs being coupled to the biometric authentication module, the routing module being configurable by the one or more control signals to route signals from one or more of the routing inputs to one or more of the routing outputs; and
   a security module, operable to determine whether a routing module configuration complies with one or more rules and, responsive to a determination that the routing module configuration does not comply with one or more of the one or more rules, generate a signal indicating that the routing module configuration is insecure.

2. The biometric authentication system according to claim 1, wherein the security module is operable in a plurality of modes, and wherein each mode has a respective set of one or more rules for determining whether a routing module configuration is secure or not.

3. The biometric authentication system according to claim 2, wherein the plurality of modes includes one or more of a biometric authentication mode and a biometric enrolment mode.

4. The biometric authentication system according to claim 3, wherein the security module is operable in the biometric authentication mode or the biometric enrolment mode to determine whether the routing module configuration is such that signal paths terminating at the one or more biometric authentication module inputs originate from one of a plurality of predefined secure inputs and, responsive to a determination that one or more signal paths terminating at the one or more biometric authentication module inputs do not originate from a predefined secure input, determine that the routing module configuration does not comply with one of the one or more rules.

5. The biometric authentication system according to claim 3, wherein the security module is operable in the biometric authentication mode or the biometric enrolment mode to determine whether the routing module configuration is such that any signal path originating at the one or more inputs terminates at an output interface of the biometric authentication system and, responsive to a determination that one or more signal paths originating at the one or more inputs terminate at an output interface of the biometric authentication system, determine that the routing module configuration does not comply with one of the one or more rules.

6. The biometric authentication system according to claim 3, wherein the security module is operable in the biometric authentication mode or the biometric enrolment mode to determine whether the routing module configuration is such that any signal path originating at the one or more inputs terminates at a node other than an input of the biometric authentication module and, responsive to a determination that one or more signal paths originating at the one or more inputs terminates at a node other than an input of the biometric authentication module, determine that the routing module configuration does not comply with one of the one or more rules.

7. The biometric authentication system according to claim 2, wherein the plurality of modes includes a listen mode in which the biometric authentication module is configured to carry out biometric authentication of signals received at the one or more biometric authentication module inputs, responsive to receipt of a trigger indicating that the biometric input signals contain voice content.

8. The biometric authentication system according to claim 7, wherein the security module is operable in the listen mode to determine whether the routing module configuration complied with one or more rules during a time window in which the voice content was uttered.

9. The biometric authentication system according to claim 8, wherein the security module is operable in the listen mode to determine whether the routing module configuration during the time window was such that:
  signal paths terminating at the one or more biometric authentication module inputs originated from a secure input and, responsive to a determination that one or more signal paths terminating at the one or more biometric authentication module inputs did not originate from a secure input, determine that the routing module configuration did not comply with one of the one or more rules;
  any signal path originating at the one or more inputs terminated at an output interface of the biometric authentication system and, responsive to a determination that one or more signal paths originating at the one or more inputs terminated at an output interface of the biometric authentication system, determine that the routing module configuration did not comply with one of the one or more rules; or
  any signal path originating at the one or more inputs terminated at a node other than an input of the biometric authentication module and, responsive to a determination that one or more signal paths originating at the one or more inputs terminated at a node other than an input of the biometric authentication module, determine that the routing module configuration did not comply with one of the one or more rules.

10. The biometric authentication system according to claim 4, wherein the security module is operable to access a configuration file containing a list of secure inputs in the biometric authentication system.

11. The biometric authentication system according to claim 4, wherein the predefined plurality of secure inputs comprise a subset of the inputs, being those inputs coupled to a predefined set of inputs of the routing module.

12. The biometric authentication system according to claim 2, wherein the security module is configured to determine whether a routing module configuration complies with one or more rules upon receipt of a request to enter a particular mode.

13. The biometric authentication system according to claim 1, wherein one of the following applies:
  the biometric authentication module is configured to abort the biometric authentication responsive to generation of the signal indicating that the routing module configuration is insecure;
  the security module is configured to invalidate the authentication result responsive to generation of the signal indicating that the routing module configuration is insecure; and
  the security module is configured to append to the authentication result an indication that the routing module configuration did not comply with one or more of the one or more rules, responsive to generation of the signal indicating that the routing module configuration is insecure.

14. The biometric authentication system according to claim 1, further comprising a data-authentication module operable to authenticate the authentication result.

15. An electronic device comprising a biometric authentication system as claimed in claim 1.

16. The electronic device as claimed in claim 15, further comprising an application processor in communication with the biometric authentication system.

17. The electronic device as claimed in claim 16, wherein the security module is operable in a plurality of modes, and wherein each mode has a respective set of one or more rules for determining whether a routing module configuration is secure or not, the plurality of modes including one or more of a biometric authentication mode and a biometric enrolment mode, wherein the security module is operable in the biometric authentication mode or the biometric enrolment mode to determine whether the routing module configuration is such that signal paths terminating at the one or more biometric authentication module inputs originate from one of a plurality of predefined secure inputs and, responsive to a determination that one or more signal paths terminating at the one or more biometric authentication module inputs do not originate from a predefined secure input, determine that the routing module configuration does not comply with one of the one or more rules, and wherein a secure input is an input which is not connected to the application processor.

18. The electronic device as claimed in claim 15, further comprising one or more input devices, coupled to the one or more inputs, for generating the biometric input signals.

19. The electronic device as claimed in claim 18, wherein the security module is operable in a plurality of modes, and wherein each mode has a respective set of one or more rules for determining whether a routing module configuration is secure or not, the plurality of modes including one or more of a biometric authentication mode and a biometric enrolment mode, wherein the security module is operable in the biometric authentication mode or the biometric enrolment mode to determine whether the routing module configuration is such that signal paths terminating at the one or more biometric authentication module inputs originate from one of a plurality of predefined secure inputs and, responsive to a determination that one or more signal paths terminating at the one or more biometric authentication module inputs do not originate from a predefined secure input, determine that the routing module configuration does not comply with one of the one or more rules, and wherein a secure input is an input the data on which originated only from the one or more input devices.

20. A biometric authentication system, comprising:
one or more inputs, for receiving biometric input signals from a user;
a biometric authentication module having one or more biometric authentication module inputs, and being configured to carry out biometric authentication of signals received at the one or more biometric authentication module inputs and generate an authentication result;
a plurality of configurable signal paths terminating at the one or more biometric authentication module inputs, at least one of the configurable signal paths originating at the one or more inputs; and
a security module, operable to determine whether the plurality of signal paths complies with one or more rules and, responsive to a determination that the plurality of signal paths does not comply with one or more of the one or more rules, generate a signal indicating that the signal path configuration is insecure.

21. The biometric authentication system according to claim 20, wherein one or more of the plurality of signal paths are configurable by being enabled or disabled, and wherein the security module is operable to determine whether the one or more signal paths are enabled or disabled.

22. The biometric authentication system according to claim 21, wherein the one or more configurable signal paths comprise a first signal path originating at an unsecure input, and wherein the security module is operable to determine whether the first signal path is enabled or disabled and, responsive to a determination that the first signal path was enabled, generate a signal indicating that the signal path configuration is insecure.

23. The biometric authentication system according to claim 22, wherein the first signal path is connected to an application processor.

24. An electronic device comprising a biometric authentication system as claimed in claim 20.

25. A biometric authentication system comprising:
a routing module, configurable in use to route received signals to at least one routing module output from a selected one or more of a plurality of routing module inputs;
a biometric authentication module coupled to receive signals from said at least one routing module output, and being configured to generate a biometric authentication result based on at least the signals received from said at least one routing module output; and
a security module, operable to determine whether the routing module is configured compliant with one or more rules and, if not compliant, modify the biometric authentication result.

* * * * *